United States Patent [19]
Blau et al.

[11] Patent Number: 5,696,697
[45] Date of Patent: Dec. 9, 1997

[54] NETWORK ELEMENT IN A TELECOMMUNICATION NETWORK

[75] Inventors: Staffan Blau, Stockholm; Göran Eneroth, Bandhagen; Peter Carlsund, Skärholmen, all of Sweden

[73] Assignee: Telefonaktiebolaget LM Ericsson, Stockholm, Sweden

[21] Appl. No.: 489,746

[22] Filed: Jun. 13, 1995

[30] Foreign Application Priority Data

Jun. 13, 1994 [SE] Sweden ................................ 9402053
Jan. 11, 1995 [SE] Sweden ................................ 9500078

[51] Int. Cl.6 .................................................. H04L 12/28
[52] U.S. Cl. ........................................ 364/514 C; 395/601
[58] Field of Search ...................... 364/514 C; 379/220, 379/221; 395/325, 600, 909, 444, 682, 601, 200.03

[56] References Cited

U.S. PATENT DOCUMENTS

| | | |
|---|---|---|
| 5,062,038 | 10/1991 | Jordan, Jr. . |
| 5,063,501 | 11/1991 | Jordan, Jr. . |
| 5,063,502 | 11/1991 | Jordan, Jr. . |
| 5,063,503 | 11/1991 | Jordan, Jr. . |
| 5,063,504 | 11/1991 | Jordan, Jr. . |
| 5,377,262 | 12/1994 | Bates et al. ........................ 379/220 |
| 5,388,258 | 2/1995 | Larsson et al. .................... 395/600 |
| 5,546,577 | 8/1996 | Marliu et al. ...................... 395/600 |

FOREIGN PATENT DOCUMENTS

| | | |
|---|---|---|
| 0529787 A2 | 3/1993 | European Pat. Off. . |
| 0578205 A2 | 1/1994 | European Pat. Off. . |
| 0579368 A1 | 1/1994 | European Pat. Off. . |
| 0609990 A2 | 8/1994 | European Pat. Off. . |

*Primary Examiner*—Emanuel T. Voeltz
*Assistant Examiner*—Thomas Peeso
*Attorney, Agent, or Firm*—Burns, Doane, Swecker & Mathis, L.L.P.

[57] ABSTRACT

A network element in a telecommunication network providing a number of different types of services, supports several telecommunication network applications (1304, 1306). It furthermore contains system resources and management information software. This software includes application specific management information and management information for system resources common to the applications, and is available to an operations system for managing the system resources when they are to be used. All of said management information is organized, from the point of view of naming, in several application specific management information bases each in the form of a respective hierarchical tree structure (1310, 1312).

12 Claims, 8 Drawing Sheets

NETWORK ELEMENT IN A TELECOMMUNICATION NETWORK

TECHNICAL FIELD OF THE INVENTION

According to a first aspect the present invention relates to an operations support network for operation and maintenance of a telecommunication network containing an operations system and a datacommunication network, via which the operations system controls the telecommunication network.

The telecommunication network includes at least one network element having, on the one hand, at least two network element functions which each provide an application in the telecommunication network, and, on the other hand, resources in the form of hardware and software. The resources are used for performing the network element functions, and include application specific resources and resources common to several applications.

Each network element includes a management view layer consisting of software and outwardly providing an interface in which the network element from the operations system appears as consisting of a number of managed objects, which represent the resources and network element functions. The managed objects are used by the operations system for managing a respective resource and network element function in connection with performing a network element function.

According to second to fourth aspects the invention relates to a telecommunication network of the kind identified above, a network element of the kind identified above, and a method for organizing software in such a network element, respectively.

According to a fifth aspect the invention relates to a network element in a telecommunication network providing a number of different types of services. The network element supports several telecommunication network applications and contains system resources and management information software which includes application specific management information and management information for system resources common to the applications. The management information software is available to an operations system for managing the system resources when they are to be used.

By the above used concept application is here generally meant something that is put on the top of a product platform consisting of the infrastructure resources of a telecommunication system. As an example can be mentioned different telecommunication functions such as usual telephony, mobile telephony such as GSM or NMT, broadband telephony etc.

DESCRIPTION OF RELATED ART

The telecommunications networks of today are large and the number of resources in the networks is increasing. The networks provide a wide variety of services and the network equipment often comes from different vendors. The network operators use a variety of different operations systems to control their networks. Each vendor's equipment often has its own operations system and the different services in the network are controlled in different ways, which results in high costs for operation and maintenance.

One way of reducing the costs for the network operators has been to develop an international standard on how telecommunications networks will be managed in a uniform and efficient way from a network of operations systems. For this purpose a standard denominated TMN (Telecommunications Management Network) has been suggested. The size of a TMN network can vary from one simple connection between an operations system and a network element, to a whole network of operations systems that control a large telecommunications network. The TMN standard has been developed by an organization denominated ITU-TS (International Telecommunication Union for Telecommunication Standardization) and the bases are described in its recommendation M.3010. The ITU-TS recommendations in turn are based upon international standard recommendations suggested by an international organization denominated ISO (International Standardization Organization).

TMN recommendations suggested thus far do not clearly state how to organize the management information in network elements supporting several "standard" applications.

There exist some application specific standards that organize the naming of management information, i.e. managed objects, in a hierarchical tree with the root of the tree consisting of a managed object named Management Element, which is defined in the ITU-T recommendation M.3100. Henceforth this managed object will shortly be denominated ME.

By the concept "managed object" is here and henceforth meant the same as managed object in the TMN recommendations. The managed objects relating to applications are said to be able to exist together in the same "management information tree", henceforth also shortly denominated MIB (Management Information Base).

There are, however, also at least three different application recommendations specifying their own root objects for the management information tree. These are SDH (Synchronous Digital Hierarchy), ATM cross connect (Asynchronous Transfer Mode) and N-ISDN (call routing) (Narrow band Integrated Services Digital Network). Each specifies its own management information tree with an own root object, i.e. a unique instance of the above mentioned ME class, or a subclass thereof. If these applications are to be supported in the same physical network element it must be possible to support in a network element more than one management information tree.

In U.S. Pat. No. 5,062,038, U.S. Pat. No. 5,063,501, U.S. Pat. No. 5,063,502, U.S. Pat. No. 5,063,503 and U.S. Pat. No. 5,063,504 there are described systems including one or more infrastructures which are used by processes executed in a processor. The infrastructures include tree structures.

SUMMARY

Generally, the invention is based upon the awareness that the following reasoning was important for leading to a solution of the problems indicated above.

A seen from the point of view of network administration it is imaginable with two different scenarios for management of multi-application network elements, viz. that the same administration manages all of the different applications provided by the network element, and that one or more of the applications is managed by a separate administration.

In the last mentioned scenario the management information for the different applications should be separated into different MIBs, since each managing administration should manage only its own managed objects. Also, authorization of access rights will then in this case be automatically associated with the domain of managed objects corresponding to that to be managed by each separate administration, since certification supervision is performed in connection with set up of communication between an operations system and a network element, and since certification is obtained for a certain MIB which is identified with the name of the root object, i.e. ME.

In the first scenario it is possible that the administration does not require certification separation of management information into different MIBs because the administration manages all applications. In such a case it is however still often practical to structurally have clearly separated management information for different applications. Different staffs can e.g. have different management knowledge expertise. There may be one expert on management of an ATM application and another expert on N-ISDN.

A consequence of supporting separate management information trees for different applications is that the management information for internal system resources shared by the applications, such as general computing system resources, operations systems, physical equipment, etc., either must be part of one of the application specific MIBs or also a separate MIB is needed for managing these resources.

Based upon the above reasoning there is a general object of the invention to indicate a new method for managing more than one management information tree in the same physical network element, i.e. more than one MIB. In that connection certain problems should be solved which relate to the hierarchical organization of the managed objects which exist in the network element. This hierarchical organization is used for translating names of a managed object which is used in operations ordered by a central operations system in the telecommunication network towards a network element, to an internal object identity for managed object identity in the infrastructure of the network element.

There is a further object in this connection to provide a solution of the problem of how to organize the naming view of the MIB in a network element in order to be able to simply combine and add different applications.

Still an object is to indicate how to structure the infrastructure and its MIB in several separate information domains, one for each separate application, each with an own MIB.

A still further object is to indicate how to name externally, i.e. from an operations system, the different MIBs of a network element.

Another object is to indicate a network element with a separate MIB for the infrastructure.

A further object is to indicate how to name relations between managed objects in the different MIBs.

Still a further object is to indicate a network element which is flexible enough to be able to solve problems in connection with naming/addressing due to the fact that different network operators can desire to have different organization of the infrastructure.

According to the invention the above and other objects, which will appear more closely below, have been attained in the operations support network, the telecommunication network, and the network element identified above according to the first to third aspects, respectively, in that the managed objects of said at least one network element have names organized in several hierarchical tree structures, all managed objects representing application specific resources being distributed on application specific tree structures, one for each application, and managed objects representing common resources being contained in a common tree structure.

The method for organizing software in the network element, according to the fourth aspect, comprises the steps of organizing names of said managed objects in several hierarchical tree structures, by distributing all managed objects representing application specific resources on application specific tree structures, one for each application, and locating managed objects representing common resources in a common tree structure.

In the network element according to the fifth aspect names identifying parts of all of said management information are organized in several application specific management information bases each in the form of a respective hierarchical tree structure.

BRIEF DESCRIPTION OF THE DRAWINGS

The invention will now be described more closely below with reference to embodiments shown on the attached drawings, on which FIGS. 1–12 are intended to generally illustrate the TMN standard which may be said to form one of the basic grounds for, and elucidate later described embodiments of the invention, wherein FIG. 1 shows an example of a telecommunication network according to TMN, FIG. 2 schematically illustrates division of a network element included in FIG. 1 in a management layer and a resource layer, FIG. 3 schematically illustrates an example of how an operations system manages a resource via a managing object representing the resource, FIGS. 4–6 schematically illustrate different examples of how managed objects can represent resources and other objects.

DETAILED DESCRIPTION OF EMBODIMENTS

As a first introduction to the following description of embodiments of the invention, and since these embodiments for practical reasons mainly are based on application of the invention in a TMN environment, a number of terms and concepts in this connection will be described more closely with reference to FIGS. 1–11. However, as will appear later on, use of the invention is not restricted to this environment, but can be stated to comprise all environments based upon the international ISO standard.

Figure 1:
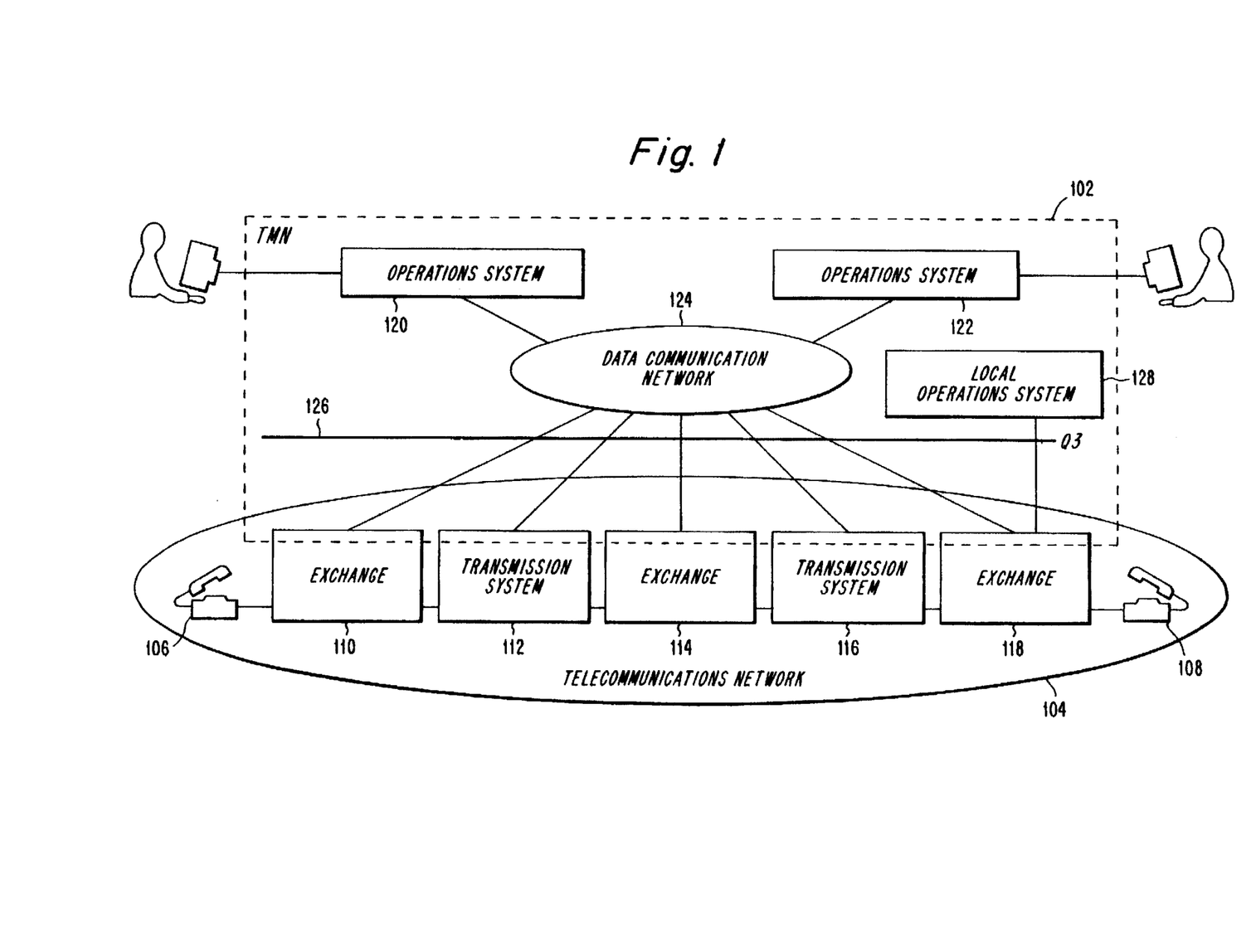

FIG. 1 schematically shows an operations network scenario 102 according to TMN for a telecommunication network 104. In the later there is indicated how two subscribers 106 and 108 are interconnected via network elements in the form of a first exchange 110, to which the subscriber 106 belongs, a first transmission system 112, a transit exchange 114, a second transmission system 116, and a second exchange 118, to which the subscriber 108 belongs. The operations network 102 contains two operations systems 120 and 122 which via a data communication network 124 and a Q3 interface 126 communicate with the elements 110–118 in the telecommunication network. Q3 is a standardized physical interface between two TMN building blocks, such as network element and operations system. It consists of two parts, viz. a management protocol and a management information model visible in the interface. For a closer description of the interface Q reference is made to the ITU recommendation M.3010. A local operations system 128 communicates directly with the exchange 108 via the interface 126.

The interface 126, Q3, over which the operations systems, such as 120, 122 and 128, view the telecommunication network 104 in TMN, is a standardized data communication interface where all types of network equipment can be managed in accordance with uniform principles. The Q3 interface defines both an object oriented information model of the network elements 110–118, and the communication protocol between the operations systems 120, 122 and the network elements 110–118.

Figure 2:
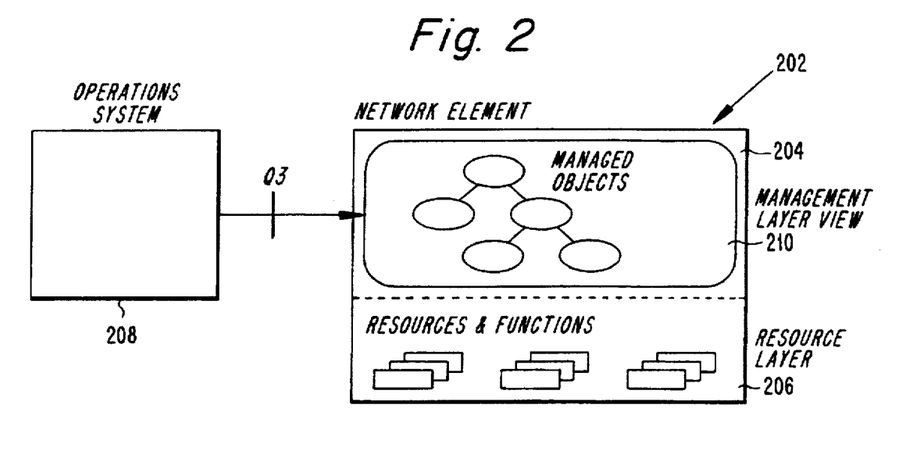

With reference to FIG. 2 a schematically illustrated network element 202 is divided into a management view layer 204 and a resource layer 206. From the operations system, here designated 208, only the management view layer 204 is visible. The management view layer 204 towards the exterior presents a view appearing as a collection of managed objects 210, which can be managed from the operations system 208 via the Q3 interface. The managed objects are defined with respect to how the network element will appear to a maintenance technician. There are standardized managed objects for most applications. Consequently, a maintenance technician will know his way about when controlling network elements from different vendors.

The resource layer 206 is the real implementation of the functionality of the network element 202. Resources are designed for the best characteristics of the system. Execution time and memory consumption are examples of characteristics to consider when implementing the resource layer.

Figure 3:
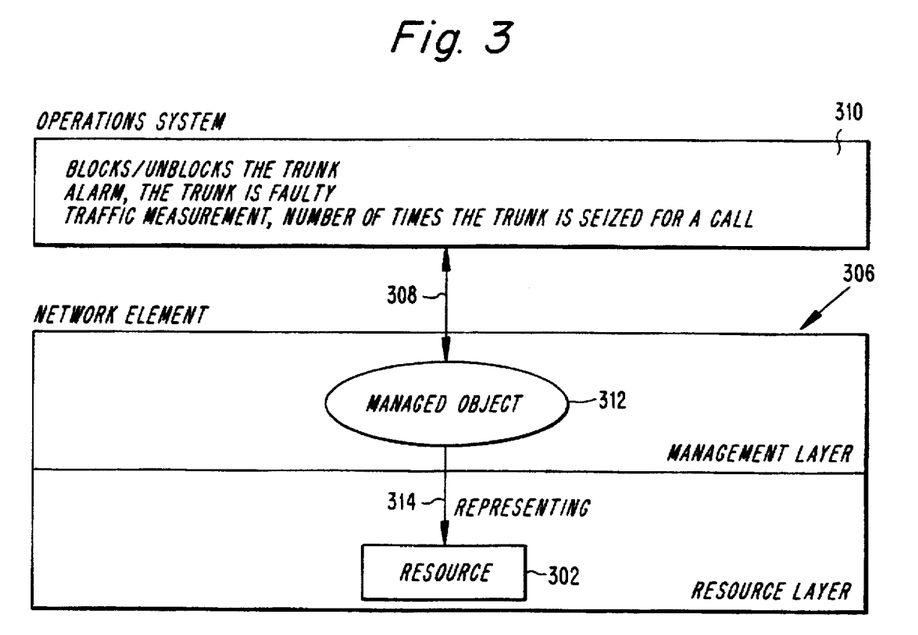
Figure 4:
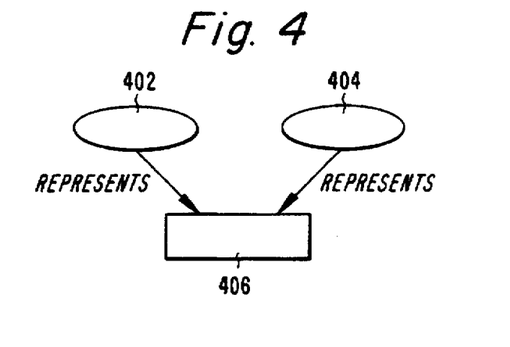

As an example FIG. 3 shows how a trunk resource 302 is managed, arrow 308, from an operations system 310 through a managed object 312, that represents, arrow 314, the trunk resource 302. The managed object 312 then acts as an "interface" towards the operations system. A managed object cannot store any data, but all data belong to the resources. There is not necessarily a 1-to-1 mapping between managed objects and resources. Several managed objects can be implemented as one resource, cf. FIG. 4, in which two managed objects 402 and 404 represent and give each its management view of a resource 406. A reason to implement the two managed objects as one resource, is to achieve better characteristics of the application.

Figure 5:
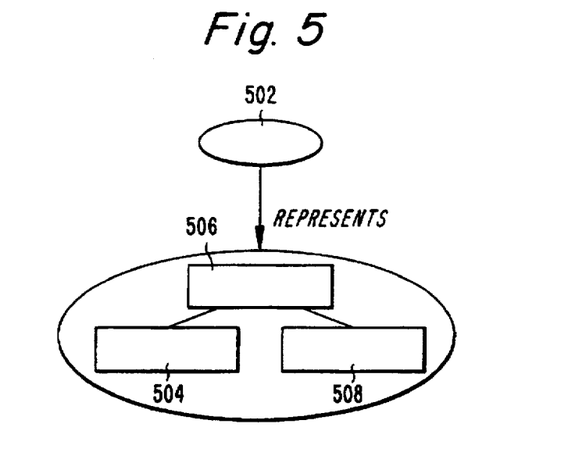

More complex managed objects could be implemented as a combination of resources, as in FIG. 5, that shows a managed object 502 representing a combination of three resources 504, 506 and 508.

Figure 6:
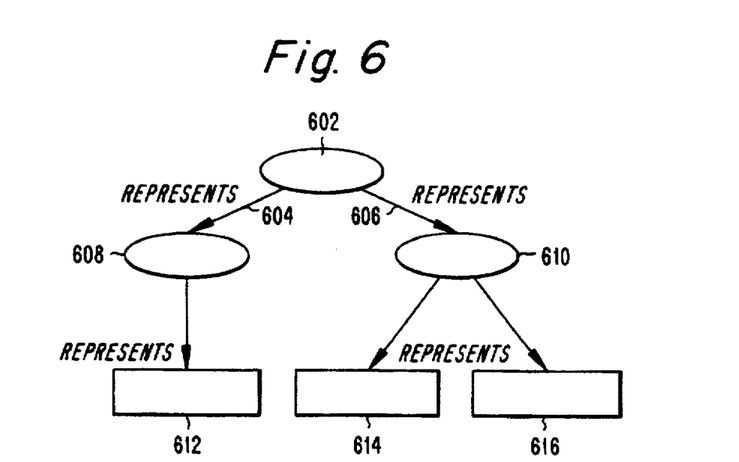

A managed object can also represent other managed objects to rise the level of abstraction, cf. FIG. 6, where a managed object 602 represents, arrows 604 and 606, two other objects 608 and 610, respectively. The object 608 then represents a resource 612, and the object 610 represents two resources 614 and 616. Operations support functions can then be implemented in the highest managed object 602 instead of in an operations system.

Figure 7:
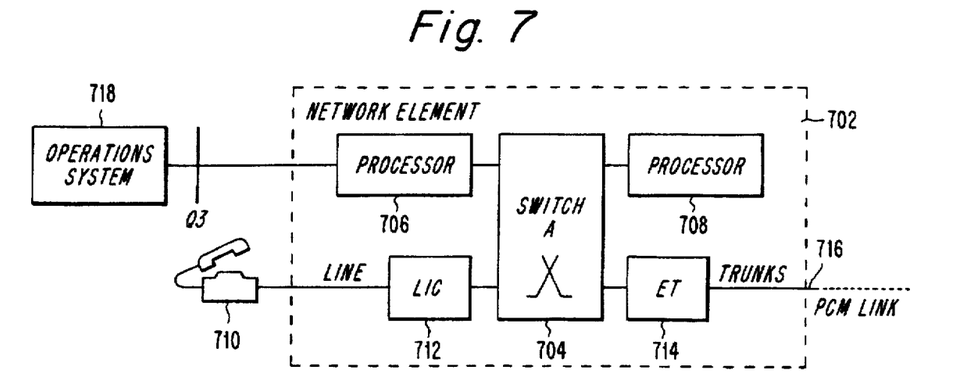
FIG. 7 shows an example of hardware included in a simple network element which may be included in the telecommunication network according to FIG. 1.

In FIG. 7 the hardware of a simple network element 702 is shown, which may here be assumed to correspond e.g. to the local exchange 110 in FIG. 1. The network element 702 includes a switch 704, to which two processors 706 and 708 are shown to be connected. To the switch 704 a subscriber 710 is connected, which may be imagined to be the same as the subscriber 106 in FIG. 1, via a subscriber line circuit 712. The network element 702 has a connection to the rest of the network through a line terminal 714, which communicates over a PCM link 716. This simple network element can be managed from an operations system 718, connected to the processor 706, corresponding to the operations system 120 in FIG. 1.

Figure 8:
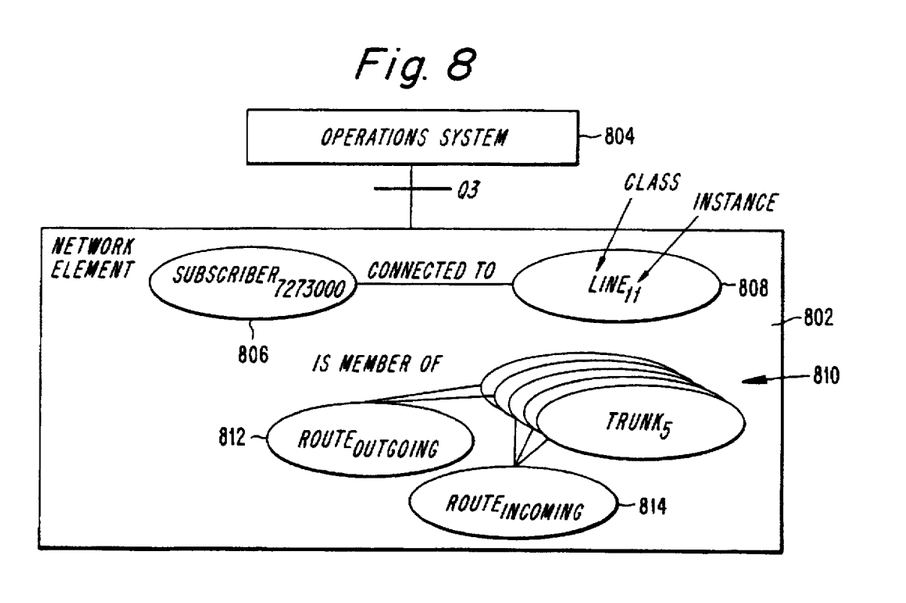
FIG. 8 shows the management object view of the network element according to FIG. 7 with different functional relations between the managed objects.

FIG. 8 only shows the management layer of the network element in FIG. 7 and is designated 802, the operations system being designated 804. More particularly, the management layer 802 consists of managed objects which are indicated with respective class names and instances in FIG. 8.

In the management layer 802 the subscriber 710 in FIG. 7 is represented by an instance 7273000 of a managed object 806 of the class Subscriber. The object 806, via which subscriber data in the resource layer can be reached, has the relation condition "connected to" to an instance 11 of a managed object 808 of the class Subscriber-line, that can reach line connection data. More particularly, this object represents the line between the subscriber and the line circuit 712 in FIG. 7. The speech channels in the PCM link 716 in FIG. 7 are represented by each an instance of an object 810 of the class Trunk. In the network element there are two trunks shown to be connected to an outgoing direction, whereas three trunks are connected to an incoming direction. This is represented by an instance "outgoing" of an object 812 of the class Route, and an instance "incoming", respectively, of an object 814 of the same class. The rest of the trunks in the PCM link are not used in the network element 702.

The data of a managed object is specified as attributes. A managed object attribute can correspond to a persistently stored attribute of a resource object, but it can also be calculated in an algorithm that fetches attributes from several resource objects. Resource data can also be stored in the file system or in hardware registers. A trunk managed object can e.g. have the following attributes: trunkId, state, and myRoute. In this case, all three attributes correspond to attributes in the same resource object.

Operations that can be performed on a managed object are:
create and delete an instance of a managed object,
get and set, that reads and writes, respectively, an attribute value,
action requests a managed object to carry out a task.

Actions are used when the operation is more complex than just getting or setting an attribute value for a managed object. Actions involve the managed object as a whole, but can also indirectly involve other managed objects.

A managed object can also send notifications, and inform the operations system that an event has occurred in the network element. An alarm condition is an example of a notification. Notifications are also used for other purposes, e.g. charging data and traffic statistics. When it takes a long time to perform an action, the action return value can tell that the performing of the task has started. Then the result of the action is sent as a notification.

In addition, managed objects can have associative relationships to other managed objects. Trunks can e.g. be members of a route. Associative relationships are specified as attributes.

In the network element disclosed above with reference to FIGS. 7 and 8 there are several trunks. All of them have the same attributes, actions and notifications. In object oriented terms they are instances of the managed object class Trunk.

The collection of all created managed object instances in a network element is called the Management Information Base MIB. The management information base is an abstract concept and is not to be confused with a physical data base which is used to store data persistently within a system.

Figure 9:
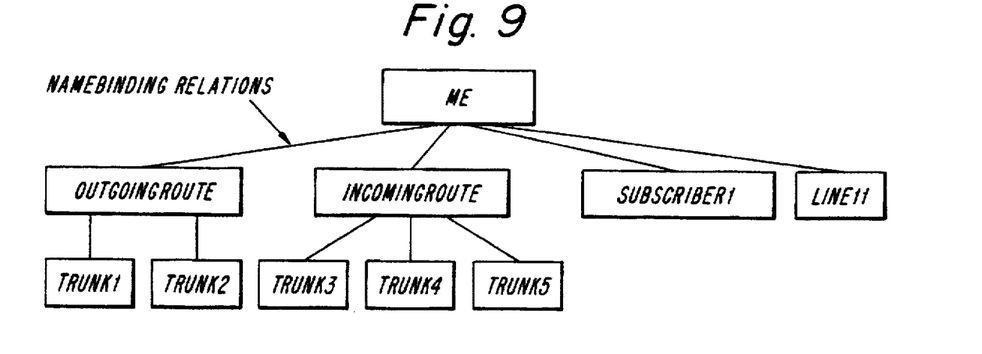
FIG. 9 shows a management information tree built up of managed objects included in the management layer in FIG. 8.

In some network elements there may be a large number of managed objects. To be able to search for a particular managed object and navigate between all by created managed object instances in a network element, it is necessary to have a settled naming structure for the managed objects so that all objects get unique names. The standard recommends naming based upon all managed object names being organized as a tree, also denominated MIT (Management Information Tree). Relations forming the MIT are called namebinding relations. In FIG. 9 the MIT for the example described above with reference to FIGS. 7 and 8 is shown, it being assumed that the network element 702/902 forms part of an ISDN network.

Each managed object gets an instance name when it is created. All managed objects that are "children" of the same managed object must have different instance names. The instance name does not need to be unique within the managed system, but two managed objects can have the same instance name provided that they have different "parents".

Every managed object also has a name that is used to identify it uniquely within the whole managed system, called a Distinguished Name DN. The distinguished name starts from the level below the root object of the MIT and finishes with the instance name of the managed object. In appearance, it looks much like a UNIX full path name. As an example the distinguished name of the instance Trunk5 of the managed object Trunk can be written:

DN={Route=incomingRoute/Trunk=Trunk5}

The communication between operations systems and network elements is defined in the Q3 interface. The standards recommend how to reach and operate managed objects from an operations system. In addition, the standards recommend how managed objects are to inform the operations system about events in the network element.

Figure 10:
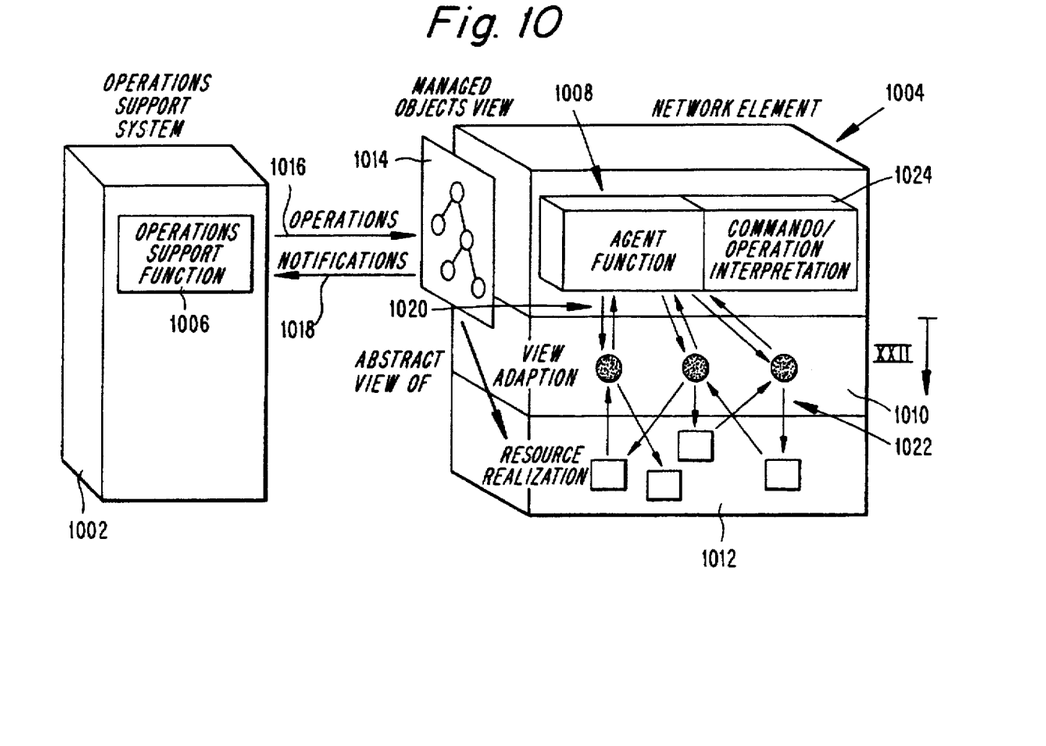
FIG. 10 is a view illustrating communication and interaction between an operations system and a network element.

An operations support function in the operations system manipulates the managed objects in the network element via a particular agent function in the network element. The interaction between the operations support function and the agent function is schematically shown in FIG. 10. The operations system designated 1002 in FIG. 10 is the managing system and the network element designated 1004 is the managed system. The operations support function is designated 1006, the agent function 1008, the managed objects 1010 and the resources which the later represent are designated 1012. For the operations system 1006 the network element 1004 appears as consisting of a number of managed objects, i.e. the objects 1010. This abstract and for the operations system 1006 only view of the network element 1004 is indicated at 1014.

The operations support function 1006 initiates contact with the agent function 1008 by establishing a communication association to the agent function. This association can be regarded as a communication link between the two systems. When the association has been set up the operations support function and the agent function can communicate with each other. The operations support function 1006 manipulates the managed objects 1010 by stating their distinguished name and using defined operations (create, delete, set, get and action) indicated by arrow 1016. The managed objects 1010 generate information, notifications, which can be forwarded as event reports, arrow 1018, to the operations system. In the Figure arrows 1020 indicate the communication of the agent function 1008 with the objects 1010, and arrows 1022 indicate relations between the objects 1010 and the resources 1012 represented by these.

The agent function 1008 handles the communication towards the operations systems 1002, creates/deletes managed objects on demand, and finds—by means of the managed object name included in an operation demand—the managed object instance aimed at. For this purpose the agent function has information regarding the association between distinguished name and a system internal identifier for the managed object having been created. The agent function also keeps information regarding allowed namebindings in the name tree and creates only an object if class identity and desired name agrees with that which is allowed.

The agent function 1008 also contains a commando/operation interpretation function 1024 in the form of an algorithm which receives and analyses messages from the operations system in connection with its above described and via the agent function performed function to manipulate the managed objects, and also handles the execution of the operations necessary for this purpose.

As a further introduction to the following description of embodiments of the invention there follows now also a brief presentation of still a description model on which this description is based.

As mentioned earlier a telecommunication network provides a great number of different types of services. Examples are: bearer services, telecommunication services, supplementary services etc. With reference to the example shown in FIG. 11 these services are often described with respect to a logical model of the network, consisting of a number of logical network planes, each plane including network element functions pertaining to a different area of services. Each logical network can thus be said to represent an application specific view of the physical network and its network elements.

Figure 11:
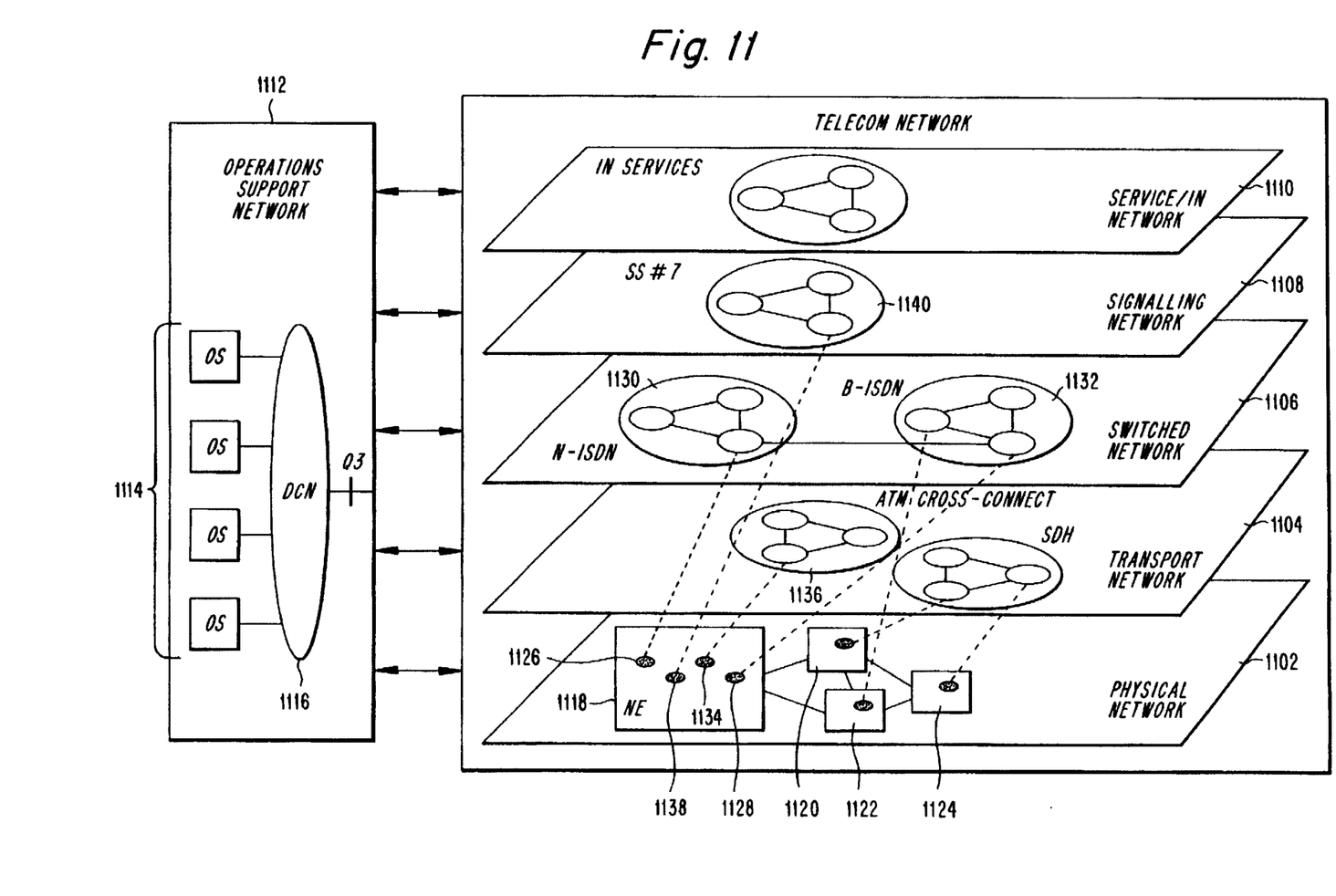
FIG. 11 is a view intended to illustrate a logical model of a telecommunication network of the kind shown in FIG. 1.

In FIG. 11 network element functions are shown as including in plane 1102 physical networks, in plane 1104 transport networks, in plane 1106 telecommunication service networks, in plane 1108 signalling networks, and in plane 1110 intelligent network services.

FIG. 11 furthermore includes an operations support network 1112 which is very schematically shown as including operations systems 1114. The operations systems 1114 communicate via a data communication network 1116 and an interface Q3 with the telecommunication system, which represents the planes 1102–1110.

The plane 1102 is shown as including, as an example, a number of network elements 1118–1124. In each such network element application specific network element functions are indicated by filled ovals. The network element 1118, which can e.g. be imagined to correspond to a transit center in the telecommunication network in question, is thus shown as including network element functions 1126 and 1128 providing N-ISDN-services 1130 and B-ISDN-services (Broad band ISDN) 1132 in the plane 1106, and a network element function 1134, providing ATM transport services 1136 in the plane 1104. The network element 1118 furthermore supports, via a network element function 1138, a SS#7 (Signal System 7—according to ITU-T standard) signalling point 1140 in the plane 1108, due to the fact that ISDN uses the SS 7 network.

Another example of such a network element for several applications could be a local switch which in FIG. 11 is schematically illustrated with the network element functions of the three network elements 1120, 1122 and 1124, respectively, and which by the later provides GSM- and ISDN-services as well as SDH crossconnection services.

Figure 12:
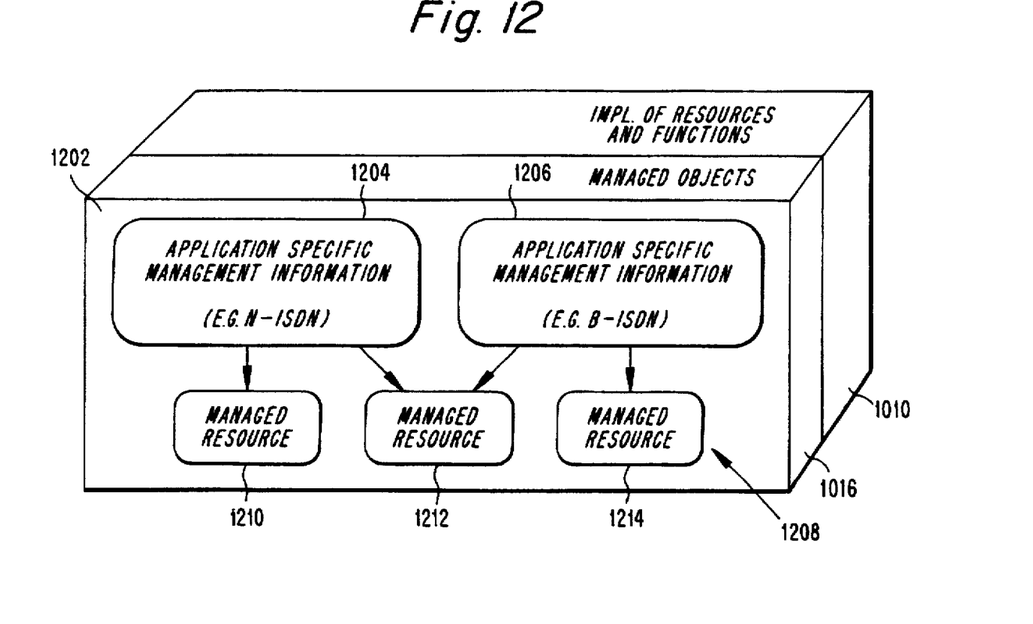
FIG. 12 is intended to illustrate different groupings of application specific management information of several applications in a network element which shall share common internal system resources.

In FIG. 12 the management view layer of the network element is furthermore shown in an alternative way, in the direction of the arrow XII in FIG. 10, wherein the managed objects more generally have been replaced by different groupings of managing information. In the Figure there is more particularly shown how, in a management view layer 1202 of a network element, a first application specific management information 1204, e.g. N-ISDN, and a second application specific information 1206, e.g. B-ISDN, share common infrastructure management resources 1208. The management information 1204 is shown as using a first and a second infrastructure management resource 1210 and 1212, respectively, whereas the management information 1206 likewise uses the second infrastructure management resource 1212 and a third infrastructure management resource 1214.

According to one of the aspects of the invention and with reference generally to earlier Figures, in particular FIGS. 1, 2, 11 and 12, a network element of the kind here intended, e.g. 1118 in FIG. 11, can be defined as including at least two network element functions, e.g. 1126 and 1128 in FIG. 11, and internal resources in the form of hardware and software. Each of the network elements provides an application, e.g. 1130 and 1132 in FIG. 11, in the telecommunication system in which they are included. The resources are used in connection with performing the network element functions. They include application specific resources and resources common to several applications. The network element is built up, besides of the resource layer, of a management view layer, e.g. 210 in FIG. 2 or 1202 in FIG. 12, in the form of managed objects, which access the information in the resource layer. The managed objects represent the resources and are used for program controlled management, e.g. by means of the operations systems 1114 in FIG. 11, of the respective resource at use of the resource in connection with performing a network element function.

In a network element of the kind just defined is, according to an essential feature of the invention, and as will appear more closely by the below description of embodiments, the management information distributed over several separate management information structures, MIBs. More particularly, all application specific management information is distributed on application specific information structures, i.e. MIBs, one for each application, and management information, that represents common resources, are included in a common management information structure, i.e. MIB.

Figure 13:
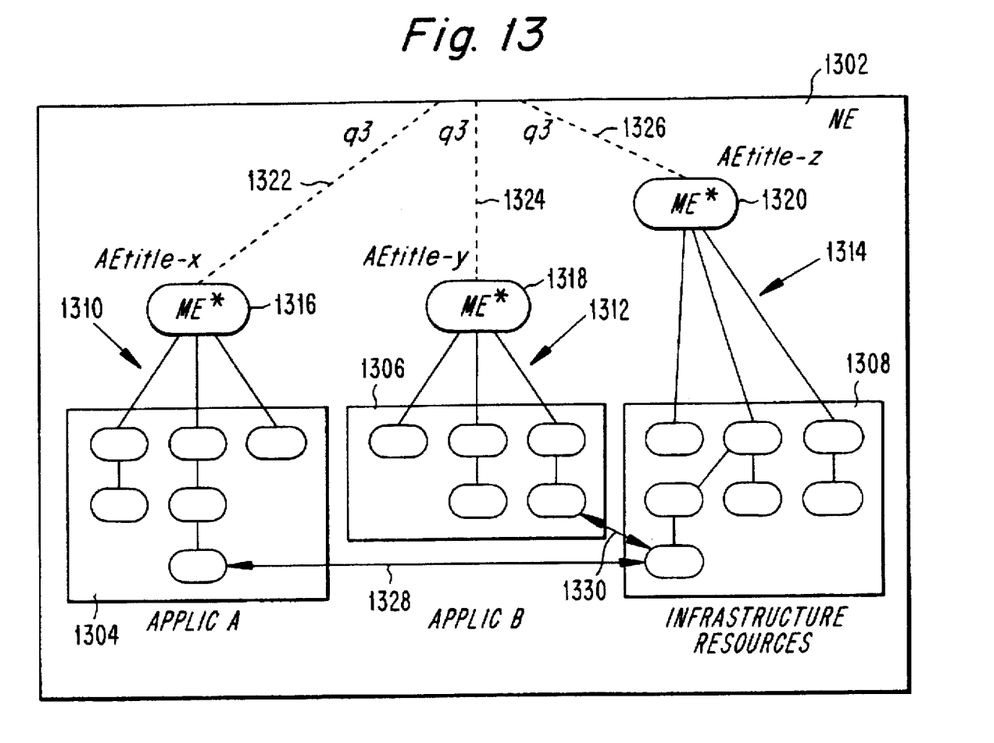
FIG. 13 is a view illustrating the implementation of a first embodiment of the network element according to the invention.

A first embodiment of the invention is shown in FIG. 13. In the management view layer 1302 of a network element there is included management information for two different applications 1304 and 1306, respectively, and management information for infrastructure resources 1308. The management information is reached via instances of managed objects, here shown for the sake of clearness only as a number of lying ovals in the respective management information set 1304–1308. Each of the management information sets 1304, 1306, 1308 forms its own MIB 1310, 1312 and 1314, respectively.

Each of the MIBs 1310, 1312, 1314 has a root object shown in the form of a ME 1316, 1318 and 1320, respectively, of the class defined in ITUT-T-recommendation M.3100 of managed objects ME, that has been indicated earlier, or a subclass of this. Characterizing for ME is that it as the only attribute has the name of a corresponding collection of management information, i.e. MIB. This name has the form AEtitle (Application Entity title) with an addition for the name of the instance, in accordance to OSI ACSE (Association Control Service Element). Corresponding to this the respective tree name in the shown example is AEtitle-x, AEtitle-y and AEtitle-z, respectively, where x, y and z represent the name of the instance. Each of the trees 1310, 1312 and 1314 has its own q3 reference point 1322, 1324 and 1326, respectively, in the management layer, and the tree is identified in the ACSE protocol by the Q3 protocol stack with an application specific AEtitle. By q3 reference point is here meant that seen by the operations system of the MIB in the Q3 interface.

Figure 14:
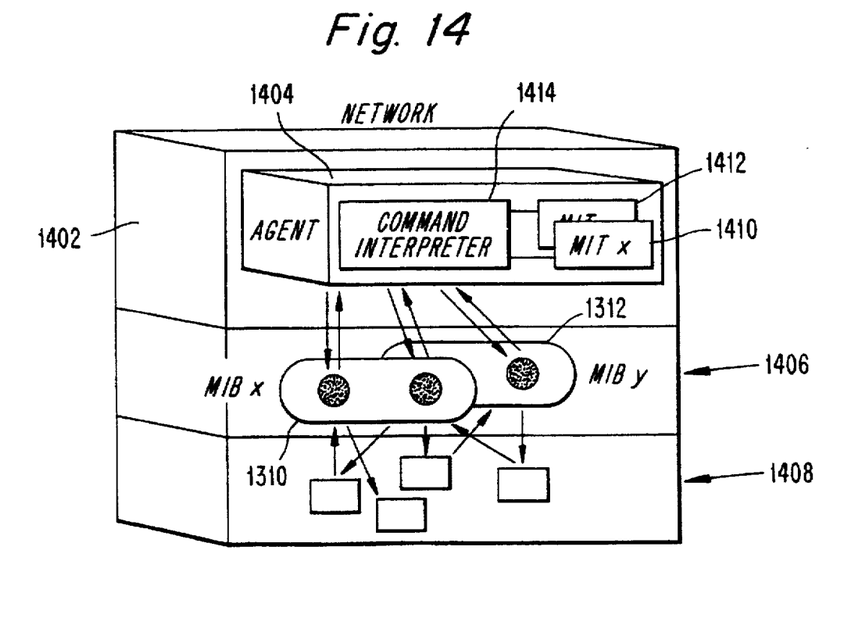
FIG. 14 is a similar view as FIG. 10 illustrating communication and interaction between an operations system and managed objects included in the network element according to FIG. 13.

With reference to the description above by means of FIG. 10 of how the interaction is performed between the operations support function 1006 and an agent function 1008, there is shown in FIG. 14 a modification of the network element 1004 in FIG. 10. From this modification it appears how the operations system in the case according to FIG. 13 by means of the agent function can reach the objects included in the respective management trees in FIG. 13. In FIG. 14 the network element is designated 1402 and the agent function 1404. Furthermore MIBs 1310 and 1312 with the instance names x and y, respectively, are indicated at 1406. The resources represented by the managed objects included in the MIBs are indicated at 1408. The agent 1404 contains naming tree information for the MIBs included in FIG. 13, as an example indicated at 1410 and 1412 for the MIBs 1310 and 1312. At 1414 a corresponding commando/operation interpreter is shown.

Figure 15:
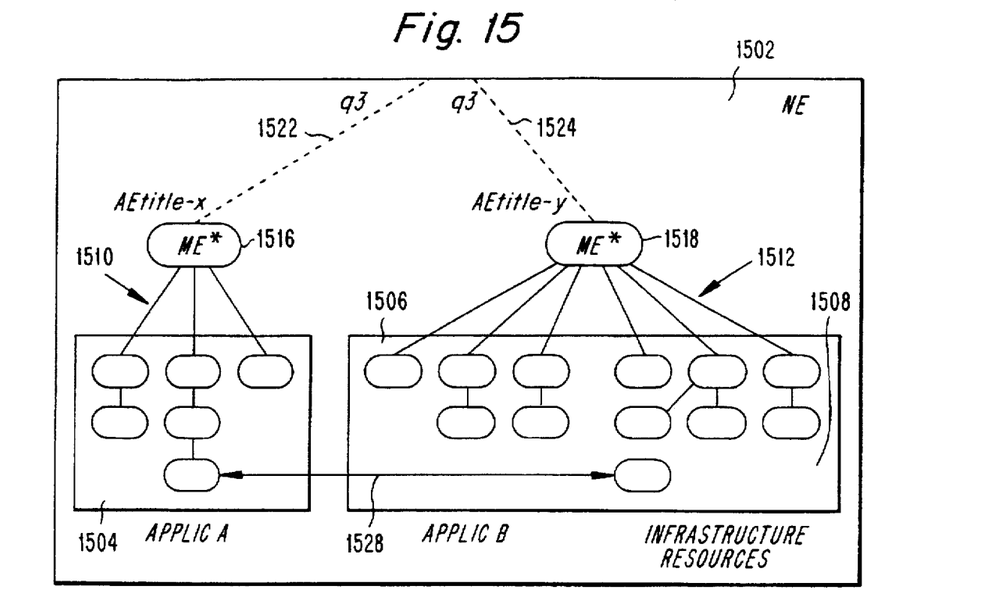
FIG. 15 is a view illustrating the design of a second embodiment of the network element according to the invention.

A second embodiment of the invention is shown in FIG. 15. In a management view layer 1502 of a network element there is included management information for two different applications 1504 and 1506, respectively, and management information for infrastructure resources 1508. The management information is reached via instances of management objects shown also here for the sake of clearness only as a number of lying ovals in the respective information set 1504–1508. Each of the management information sets 1504, 1506, 1508 form a respective MIB, the set 1514 in a MIB 1510 and the sets 1506 and 1508 in a common MIB 1512.

Each of the MIBs 1510 and 1512 has a root object shown in the form of a ME 1516 and 1518, respectively, of the class of managed objects defined in ITUT-T recommendation M.3100 or a subclass thereof. Each of the trees 1510 and 1512 has its own q3 reference point 1522 and 1524, respectively, in the management layer, and the tree is identified in the ACSE layer of the Q3 protocol stack with the application specific title AEtitle-x and -y, respectively.

In FIGS. 13 and 15 inter-MIB relations within a network element are furthermore indicated by double arrows 1328, 1330 and 1528, respectively.

The two embodiments of the invention described above have important advantages.

They are adapted to standards where different MIBs require different class definition for its specification of the management root object.

It is possible to perform authentication control for each MIB at establishment of a management association.

The first embodiment, according to FIG. 13, has the advantage over the second one, according to FIG. 15, that it is possible to perform authentication control separately for managing the infrastructure resources.

As has appeared from the above each separate application specific MIB has as a root object a managed object of a specific (i.e. for each market/or application) specialization of the class of managed objects ME, which is included in the standard recommendation M.3100. Each application has thus its own q3 reference point and the MIB thereof is identified in the ACSE layer of the Q3 protocol stack with an application specific AEtitle. Consequently, also authentication control is performed for each MIB at establishment of management communication association between an operations system and the network element.

If the managed objects representing system infrastructure resources are put in a separate MIB, such as 1314 in FIG. 13, this management object is also named by a separate instance of the class of managed objects ME. This implies that also the system infrastructure MIB is identified in the Q3 protocol with its own AEtitle, and MIB specific authentication is done at establishment of a communication association.

When there are different MIBs in a network element, as in FIGS. 13 and 15, there is a need of supporting the existence of inter MIB relations within a network element, i.e. relations between management objects in different MIBs in the network element, cf. the arrows 1328 and 1330 in FIG. 13 and an arrow 1528 in FIG. 15. This is e.g. the case when one of the applications offers its services to the other applications.

Two possible solutions are conceivable for this purpose. According to one solution inter MIB relations within a network element are represented by an attribute with a network global "distinguished name". This however requires coordination of the naming between all network elements and all operations systems, i.e. globally unique root names. However this is often not supported in the networks of today. The other solution, which may be preferable because it is easy to implement, implies that inter MIB relations within a network element are represented by an attribute which is not only referring to "distinguished name" for the object instance within a MIB, but also to an AEtitle, which uniquely identifies the other MIB as seen from the operations system.

If there are requirements for support of "scope-and-filtering" (operations on more than one object at a time) that spans over more than one application in a network element, e.g. performing "scope-and-filtering" over both GSM and N-ISDN subscriber data, these particular applications must be specified within the same MIB, assuming that there in the operations systems exists no special support for scanning over several MIBs.

If it is acceptable for the administrations to explicitly having to divide such an activity in two separate activities, separate MIBs can be used for each application.

Also it could be quite possible within a network element to have a mediation function for particular multi MIB operations.

Here the management of so called support objects in a network element containing several applications will be disclosed more closely. More particularly there is the question of managed objects offering general management support, which is not needed for the usual function of telecommunication services. These management objects are often needed in all applications and are usually denominated "support objects" in standard recommendations. They are for example of the classes Management Operations Schedule, Log, Event Forwarding Discriminator (EFD), State change Record, ObjectCreationRecord, Alarmrecord, Alarm Severity Assignment Profile, etc. Managed objects of these classes can be included in each application specific MIB, cf. FIG. 15.

Since FIG. 15 illustrates the same situation as FIG. 13 the same reference characters have been used in FIG. 15 for designating the same elements, with the exception that in FIG. 15 the first digits 15 replace corresponding digits 13 in FIG. 13 for indicating to which Figure they belong.

Figure 16:
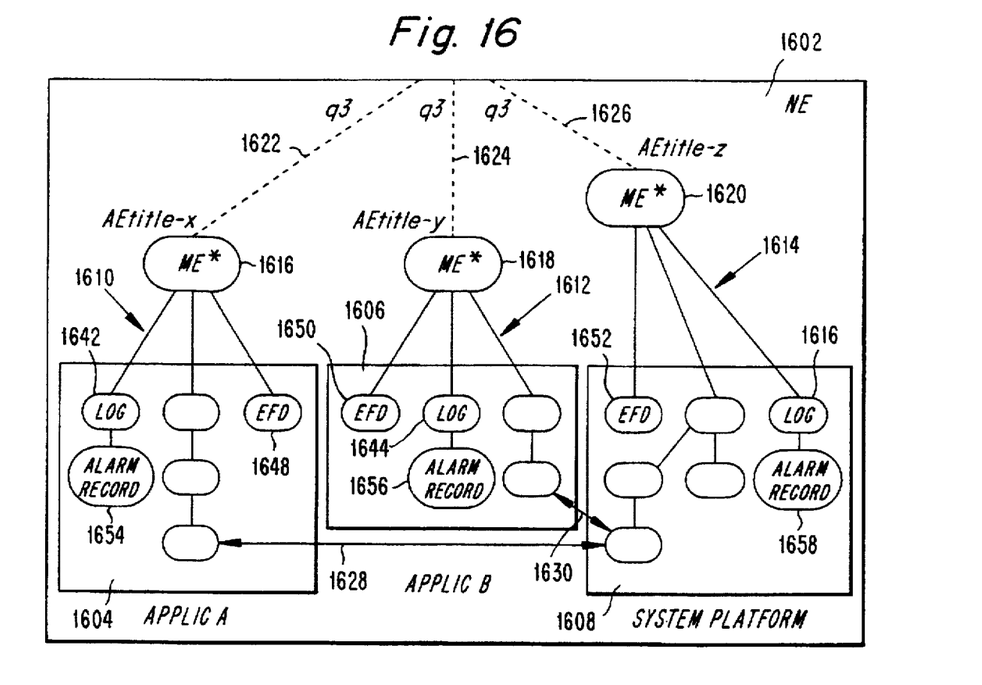
FIG. 16 illustrates localization of so called support objects in the example according to FIG. 13.

In FIG. 16 there is specified in each of the three MIBs 1610, 1612 and 1614, respectively, the class Log in a managed object 1642, 1644 and 1646, the class EFD in a managed object 1648, 1650 and 1652, and the class Alarmrecord in a managed object 1654, 1656 and 1658. The support objects created in a certain management association will result in managed objects with namebinding to the ME being the root of the MIB for the association in question. When discriminators are created (in Log or EFD) the managed object instances in question are identified with locally distinguished names which implies that reference can only be made to instances of managed objects in the same MIB. Since the extent of the discriminator specification at most can identify managed objects in the same MIB as the EFD object resides in, it is not possible to centralize the location of the support objects used by the different application MIBs, i.e. they cannot be placed in a common central MIB. This is due to the fact that no managed objects in other MIBs can be reached since the local distinguished name root is the ME for this MIB.

Equipment management in connection with a network element with more than one MIB will now be discussed more closely.

A network element comprises separate pieces of equipment, such as for instance cabinets, subracks, circuit boards, power packs, fans etc. Each such separate equipment unit is normally to be represented by a managed object, of the M.3100 equipment class, or subclass derived therefrom. This is for the purpose of being able to manage for example equipment alarm indication, equipment repair, equipment upgrade in equipment compilations etc.

In a network element with many MIBs all equipment managed objects should be placed in one and the same MIB, the system infrastructure MIB, if there is such a separate infrastructure MIB, independently of the specific hardware provided by a particular equipment unit. There are basically two aspects of equipment management that motivate this, as will be discussed henceforth.

The first aspect has to do with the management of the separate pieces of physical equipment:

If one were to distribute the managed objects of different equipment units between different MIBs then it would not be possible to perform, within the same management association, scope/filtering operations that cover all the installed equipment.

Having equipment managed objects in several MIBs would be particularly confusing from the point of view of equipment repair and upgrade, if the corresponding equipment units are installed in the same cabinet/subrack.

Basic to the second aspect, is that it should be possible for different applications to share the use of physical equipment. It should be quite common, in a multi-MIB case, for managed objects of different application MIBs to have dependency relations to the same equipment managed objects. Determining the application managed object that depends from a particular equipment managed object is sometimes a pure resource configuration/allocation issue.

A special example of this is sharing of central processing resources. Such equipment should be managed taking all application specific processing into account. Therefore, in a multi-MIB network element, such equipment should consist of a MIB common to all applications.

Actually, there are several reasons for all equipment managed objects to reside in this common MIB, disregarding of what applications that use the equipment hardware in runtime. One specific reason is for instance that in a distributed processing environment, the managed objects of the processing environment are dependent of the same equipment resources as are the managed objects of applications. Also, the managed objects of the distributed processing environment often have more intricate inter-relationships with equipment, than have the managed objects of applications. Therefore, it is convenient to place all equipment objects, together with all operating system managed objects, in the same MIB, as is shown in FIG. 13.

What actually makes this possible, is that equipment managed objects not normally include information for management of the actual functions supported by the hardware. In most cases this is better managed, and is even required by some application standards to be managed, through application specific managed objects residing in the application MIBs.

For example, the MIB of an application may include managed objects for termination points (communication endpoints), which in runtime correspond to particular line-interface-hardware provided by different equipment units. However, there is seldom any good reason for having managed objects for the actual line-interface-hardware on the equipment unit. Any management associations between equipment managed objects and application managed objects, are instead best handled by way of relationship attributes in either the equipment objects, or in special resource allocation/association objects.

To be able to see the reverse association, standard application managed objects with relationship may be extended with association attributes towards equipment objects (respectively towards resource association objects).

This principle, of separation of equipment management aspects of hardware and the management of application aspects of hardware, is actually general, disregarding of whether a network element contains one or more MIBs.

We claim:

1. An operations support network for operation and maintenance of a telecommunication network comprising:

an operations system and a datacommunication network, the operations system controlling the telecommunication network via the datacommunication network;

the telecommunication network including at least one network element having means for performing at least two network element functions, each providing a telecommunication network application; the performing means having hardware and software resources including application specific resources and resources common to several applications;

each network element having a software management view layer providing an interface to the operations system, wherein the network element appears as a number of managed objects representing resources and network element functions that are used by the operations system for managing a respective resource and network element function when performing a network element function, wherein the managed objects of said at least one network element have names organized in several hierarchical tree structures; all managed objects representing application specific resources are distributed on application specific tree structures, one for each application, and managed objects representing common resources are contained in a common tree structure.

2. A telecommunication network comprising:

at least one network element having means for performing at least two network element functions, each providing a telecommunication network application; the performing means having hardware and software resources including application specific resources and resources common to several applications;

each network element having a software management view layer providing an interface to an operations system, wherein the network element appears as a number of managed objects representing resources and network element functions that are used for managing a respective resource and network element function when performing a network element function, wherein the managed objects of the at least one network element have names organized in several hierarchical tree structures; all managed objects representing application specific resources being distributed on application specific tree structures, one for each application, and managed objects representing common resources being contained in a common tree structure.

3. A network element included in a telecommunication network comprising:

means for performing at least two network element functions, each providing a telecommunication network application; the means for performing having hardware and software resources including application specific resources and resources common to several applications, the network element having a software management view layer providing an interface to an operations system wherein the network element appears as a number of managed objects representing resources and network element functions that are used by the operating system for managing a respective resource and network element function when performing a network element function, wherein the managed objects of said network element have names organized in several hierarchical tree structures; all managed objects representing application specific resources are distributed on application specific tree structures, one for each application, and managed objects representing common resources are contained in a common tree structure.

4. In a telecommunication network, a method for structuring software in a network element having means for performing at least two network element functions, each providing a telecommunication network application; the performing means having hardware and software resources including application specific resources and resources common to several applications, the network element having a software management view layer providing an interface to an operations system, wherein the network element appears as a number of managed objects representing resources and network element functions that are used by the operations system for managing a respective resource and network element functions when performing a network element function, comprising the steps of:

organizing names of the managed objects in several hierarchical tree structures;

distributing all managed objects representing application specific resources on application specific tree structures, one for each application, and locating managed objects representing common resources in a common tree structure.

5. A network element in a telecommunication network providing a number of different types of services; the network element supporting several telecommunication network applications comprising, system resources and management information software that includes application specific management information and management information for system resources common to the applications, wherein the management information software is available to an operations system for managing the system resources when they are used, and the names identifying parts of all of the management information are organized in several application specific management information bases, each in the form of a respective hierarchical tree structure.

6. A network element in a telecommunication network providing a number of different types of services; the network element supporting several telecommunication network applications comprising, system resources and management information software that includes application specific management information and management information for system resources common to the applications, wherein the management information software is available to an operations system for managing the system resources when they are used, and the names identifying parts of all of the management information are organized in several application specific management information bases, each in the form of a respective hierarchical tree structure and the management information for common resources is handled by a separate tree.

7. A network element in a telecommunication network providing a number of different types of services; the network element supporting several telecommunication network applications comprising, system resources and management information software that includes application specific management information and management information for system resources common to the applications, wherein the management information software is available to an operations system for managing the system resources when they are used, and the names identifying parts of all of the management information are organized in several application specific management information bases, each in the form of a respective hierarchical tree structure and the management information for common resources is managed by the same tree as application specific information.

8. A network element in a telecommunication network providing a number of different types of services; the network element supporting several telecommunication network applications comprising, system resources and management information software that includes application specific management information and management information for system resources common to the applications, wherein the management information software is available to an operations system for managing the system resources when they are used, and the names identifying parts of all of the management information are organized in several application specific management information bases, each in the form of a respective hierarchical tree structure and each management information tree for application specific information has a root object that is a managed object of a specific class of managed objects, or a subclass thereof, and the managed object is the only attribute having the name of the corresponding management information tree.

9. A network element according to claim 8, wherein the management information tree for common system resources has a root object that is a managed object of the specific class of managed objects, or a subclass thereof.

10. A network element in a telecommunication network providing a number of different types of services; the network element supporting several telecommunication network applications comprising, system resources and management information software that includes application specific management information and management information for system resources common to the applications, wherein the management information software is available to an operations system for managing the system resources when they are used, and the names identifying parts of all of the management information are organized in several application specific management information bases, each in the form of a respective hierarchical tree structure and managed objects in different management information trees are related.

11. A network element according to claim 10, wherein the relations between managed object instances are represented by an attribute with a globally distinguished name.

12. A network element according to claim 10, wherein the relations between managed object instances in different management information trees, as seen from the operations system, are represented by an attribute referring to a management tree unique name for the object instance in the respective management information tree and identifying the other management information tree.

\* \* \* \* \*